United States Patent [19]
Malygin et al.

[11] 3,868,966
[45] Mar. 4, 1975

[54] ELECTROPNEUMATIC VALVE

[76] Inventors: Petr Vasilievich Malygin, prospekt Ilicha, 22, kv. 45; Valentin Mikhailovich Kochetkov, ulitsa Snezhnaya, 19, kv. 14; Alexei Efimovich Tolkachev, ulitsa Leskova, 10, kv. 59, all of Gorky, U.S.S.R.

[22] Filed: June 13, 1974

[21] Appl. No.: 479,265

[52] U.S. Cl................ 137/596.16, 91/36, 137/628
[51] Int. Cl............................................. F15b 13/07
[58] Field of Search ............ 91/36, 38; 137/596.14, 137/596.15, 596.16, 596.18, 624.14, 624.18, 624.2, 628

[56] References Cited
UNITED STATES PATENTS
2,984,218   5/1961   Christianson ................. 137/596.15

*Primary Examiner*—Alan Cohan
*Assistant Examiner*—Gerald A. Michalsky

[57] ABSTRACT

An electropneumatic valve comprising a body with branching off channels for the delivery of compressed gas to the actuating mechanisms and its discharge into the atmosphere. Each branch of the channel for the delivery of compressed gas is provided with a spring-loaded closing element. To ensure successive opening of the closing elements and for the delivery of compressed gas to, and its discharge from, the actuating mechanisms, the stiffness of the springs of said closing elements is different. This allows a single valve to be used to control the operation of two actuating mechanisms.

2 Claims, 5 Drawing Figures

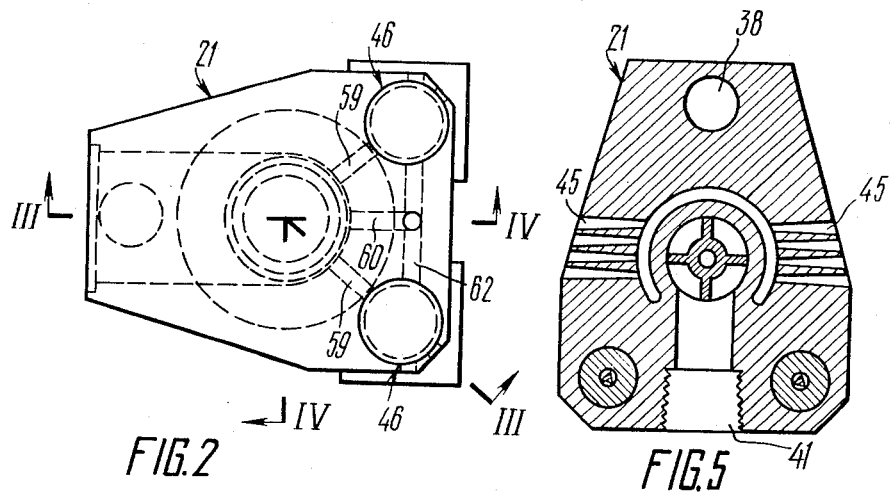

ELECTROPNEUMATIC VALVE

The present invention relates to pneumatic pipe fittings and more specifically it relates to electropneumatic valves.

This invention can be used in the pneumatic drives of power cylinders.

Most successfully the present invention can be utilized in press-forging equipment in which the drive shaft, for example of a press, carries separately installed clutch and brake controlled by pneumatic cylinders. The clutch and the brake are provided for the control of the actuating mechanism.

Known in the art is an electropneumatic valve whose body comprises channels for the delivery of compressed gas to an actuating mechanism and discharge of used gas into the atmosphere, and two elastic diaphragms arranged parallel to, and at a certain distance from, each other with a space between said diaphragms which communicates with the channel for the delivery of compressed gas through a servo-actuated valve whose inside chamber is in constant communication with said channels, said servoactuated valve controlling a spring-loaded closing element which is connected rigidly with one of the diaphragms and closes said channel for the delivery of compressed gas.

The known electropneumatic valve has a hollow body with upper and lower covers. Arranged parallel to each other in the valve body are elastic diaphragms one of which carries a spring-loaded closing element secured in the centre of the diaphragm and intended to shut off the channel in the valve body for the delivery of compressed gas to the actuating mechanism of, say, a press. The seat of the closing element is made in a horizontal partition located inside the valve body. The peripheral portions of the diaphragms are rigidly clamped in the body.

The lower cover of the valve body has a chamber with a servo-actuated valve which has two slide valves interconnected by a pin which passes freely through a hole in a bushing installed in the cover. Each of the face surfaces of the bushing has a seat for the corresponding slide valve. The slide valves of the servo-actuated valve are made in the form of truncated cones whose smaller bases face each other. The end of the pin which connects the slide valves is brought outside the cover and connected by a system of levers with the armature of an electromagnet which moves the slide valves of the servo-actuated valve.

The servo-actuated valve controls the delivery of compressed gas into the space between the diaphragm. For this purpose the chamber accommodating the servo-actuated valve communicates through channels in the valve body and lower cover with the channel for the delivery of compressed gas and with the space between the diaphragms.

The upper cover of the valve body has channels for the delivery of compressed gas to the actuating mechanism and for discharging the used gas into the atmosphere. The outlet hole of the latter channel is located approximately opposite the central part of the diaphragm which carries no closing element. Besides, the upper cover has a cylindrical bore which, together with one of the diaphragms, forms a space for the communication between both of the above-mentioned channels.

The electropneumatic valve of the known design functions as follows.

As the electromagnet is energized, its armature moves and, acting through a system of levers, lifts the pin which connects the slide valves of the servo-actuated valve to each other. As a result, the lower slide valve will come onto its seat whereas a circular gas created between the upper slide valve and its seat will admit compressed air into the space between the diaphragms from the channel for the delivery of compressed air through the channels in the valve body and cover.

As pressure mounts gradually in this space, the diaphragms start to deflect; the diaphragm carrying the spring-loaded closing element will deflect later because it is acted upon by the spring. The free diaphragm which is first to deflect will shut off the channel for the discharge of the used gas into the atmosphere after which the other diaphragm carrying the closing element will shift said element away from its seat. This will open the channel for the delivery of compressed gas to the actuating mechanism, e.g. to one of the chambers of a power cylinder, thus sending its piston on a working stroke. On completion of one working cycle of the power cylinder the electromagnet is deenergized. The pin with the slide valves of the servo-actuated valve moves down, the upper slide valve comes onto its seat and the supply of compressed air into the space between the diaphragms ceases, this space being connected to the atmosphere through the channels in the valve body and cover and through the circular gap between the lower slide valve of the servo-actuated valve and its seat. Then the diaphragm carrying the closing element returned by the spring of said element to the initial position and the closing element shuts off the channel for the delivery of compressed gas to the actuating mechanism. Then the free diaphragm returns to the initial position, opening the channel for the discharge of the gas from the power cylinder into the atmosphere. As pressure in the power cylinder drops, its piston returns to the initial position.

The field of application of the known electropneumatic valve is limited because it can be employed to control the operation of a single power cylinder only. For controlling the operation of two and more cylinders, as in presses, it is necessary to provide the corresponding number of valves which operate in a certain sequence. This is a serious disadvantage of the known valve.

Known in the previous art are valves combined into a system intended to control the operation of two pneumatic power cylinders. Such a system consists of two identical valves each comprising a hollow body with a slide valve inside. The slide valve is rigidly connected with a piston which is capable of reciprocating in the valve body. The slide valve closes the channel for the delivery of compressed air to the actuating mechanism of the power cylinder. The movement of the slide valve with the piston is controlled by a servo-actuated valve. The definite operating sequence of the valves included into the control system is ensured by selecting the areas of the slide valves which are subjected to the pressure of the compressed air delivered to the power cylinder.

Such systems can also be made up from the valves whose design has been described above. The operating sequence of these valves can be set by adjusting the spring of each closing element.

These systems are unreliable and inconvenient in operation. Besides, they are complicated in design, bulky and heavy.

An object of the present invention is to provide an electropneumatic valve of a simpler design, smaller size and lighter weight than the known valves of a similar application.

Another object of the invention is to improve the reliability of the valve.

This object is accomplished by providing an electropneumatic valve whose body with channels for the delivery of compressed gas to an actuating mechanism and for the discharge of the used gas into the atmosphere accommodates two elastic diaphragms arranged parallel to, and at a certain distance from, each other with a space between said diaphragms which communicates with the channel for the delivery of compressed gas through a servo-actuated valve whose inside chamber is in constant communication with this channel, said servo-actuated valve controlling a spring-loaded closing element which is connected rigidly with one of the diaphragms and closes said channel for the delivery of compressed gas wherein, according to the invention, the valve channels for the delivery of compressed gas and discharge of the used gas into the atmosphere have branches for the delivery of compressed gas to, and its discharge from, another actuating mechanism, the branch of the channel for the delivery of compressed gas provided with a spring-loaded closing element rigidly connected with another elastic diaphragm, the stiffness of the spring of said closing element being different from that of the spring of the first closing element to ensure the successive opening of these elements.

Due to the provision of the second spring-loaded closing element it has become possible to use the valve according to the invention for the control of two power cylinders in a certain succession, for example for the control of a press clutch and brake.

It is practicable that the valve body should accommodate a pipe connection which is arranged coaxially with each of the closing elements, and is a branch of the channel for the delivery of compressed gas to the actuating mechanism and that said branch should communicate with the channel for the discharge of the used gas to the atmosphere when the closing element is closed and be closed by the corresponding elastic diaphragm when the closing element is open.

The use of elastic diaphragms in the capacity of closing elements has decreased considerably the size and weight of the valve thus facilitating its installation on the pipes and promoting its reliability.

Now the invention will be described in detail by way of example with reference to the accompanying drawings, in which:

FIG. 2 is a plan view of the electropneumatic valve according to the invention;

FIG. 5 is a section taken along line V — V in FIG. 4.

Figure 1:
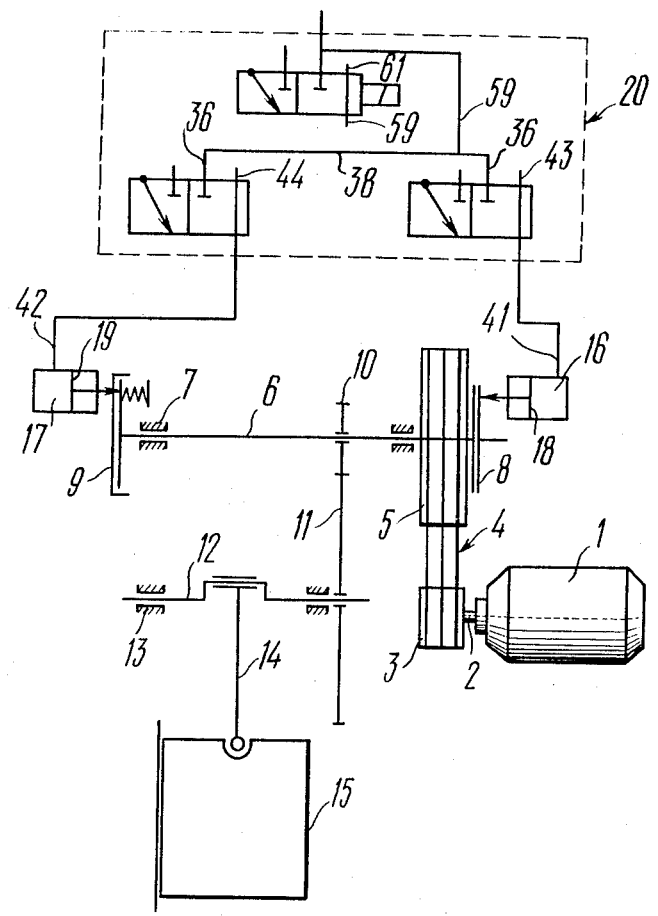
FIG. 1 is a schematic view of a press control system incorporating the electropneumatic valve according to the invention.

The electropneumatic valve according to the invention is used to control the functioning of two power cylinders. In this particular case we shall consider a control system of a press incorporating the electropneumatic valve according to the invention. The control system comprises an electric motor 1 (FIG. 1) whose shaft 2 carries a pulley 3 connected by a belt drive 4 with a flywheel 5 installed on the press drive shaft 6. The shaft 6 is mounted on bearings 7 secured to the press bed (not shown in the drawing). One end of said shaft 6 carries a clutch 8 and the other end mounts a brake 9. Besides, the shaft mounts a gear 10 which meshes with a gear 11 installed on the crankshaft 12 of the press drive. The crankshaft 12 is also installed on bearings 13 secured to the press bed. A connecting rod installed on the journal of the crankshaft 12 is provided at the end with an articulated slide 15 of the press.

The clutch 8 and brake 9 are intended to control the movement of the slide 15. The clutch 8 and brake 9 are controlled, in turn, by power cylinders 16 and 17, respectively, the actuating mechanism of each power cylinder being constituted, respectively, by pistons 18 and 19. The motion of the pistons 18 and 19 is controlled by the electropneumatic valve 20 according to the invention.

Figure 3:
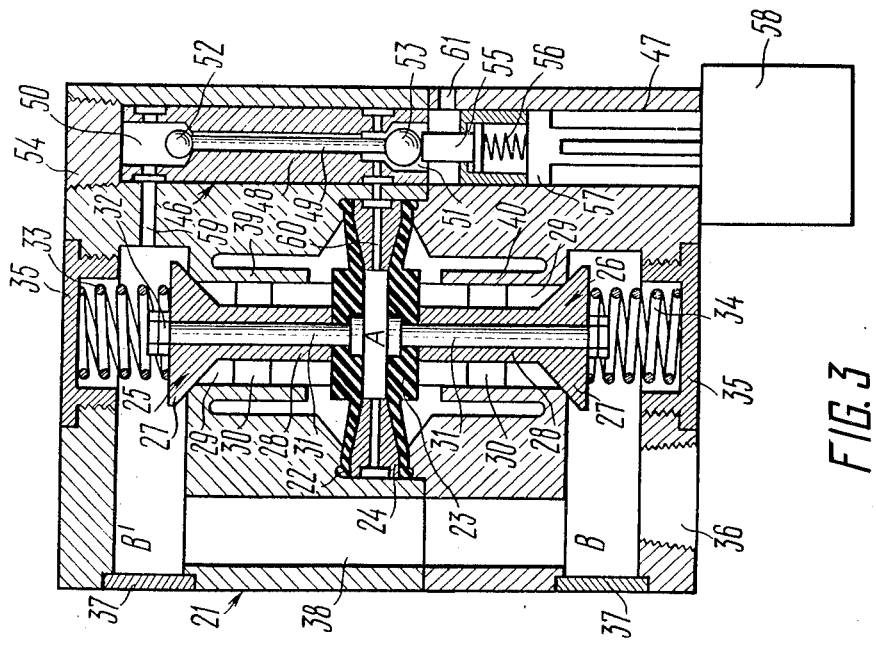
FIG. 3 is a section taken along line III — III in FIG. 2.

The electropneumatic valve 20 has a split body 21 (FIG. 2) which is hollow in the middle. The body 21 accommodates two elastic diaphragms 22 (FIG. 3) and 23 arranged parallel to, and at a certain distance from, each other, whose peripheral portions are clamped in the body 21 by an intermediate ring 24 located between the diaphragms 22 and 23 and pressing their edges against the walls of a circular recess on the side surface of the chamber in the body 21. This forms a closed space A between the diaphragms 22 and 23. The central part of each diaphragm 22 and 23 has a boss for fastening the closing element 25 and 26 respectively. Each closing element 25 and 26 is made in the form of a truncated cone 27 whose smaller base adjoins a cylindrical extension 28 made integral with the cone 27. Arranged along the generating lines of the cylindrical extension 28 are four ribs 29 set at an angle of 90° to each other, approximately. The ribs 29 have ports 30 in the middle.

Each of the closing elements 25 and 26 has an axial through hole for a bolt 31. The head of the bolt 31 is located in a recess in the centre of the boss of the corresponding diaphragm 22 or 23 and the end of the bolt 31 has a screwed-on nut 32. The bolt 31 with the nut 32 is used to fasten the closing element 25 or 26 on the corresponding diaphragm 22 and 23, perpendicularly to the latter.

The closing elements 25 and 26 are loaded by springs 33 and 34, respectively; one end of each spring bears against the face of the corresponding closing element while its other end, against nut 35 secured in the body 21 of the valve 20. The springs 33 and 34 are of different stiffness which is selected to suit the time elapsing between the motions of the closing elements 25 and 26.

The wall of the valve body 21 has a hole 36 for the delivery of compressed gas into space B located in the lower part (in the drawing) of the body 21. The hole 36 together with space B forms a part of the channel for the delivery of compressed gas to the actuating mechanism, e.g. to the piston 19 (FIG. 1) of the pneumatic power cylinder 17. The upper part (in the drawing) of the body 21 also has space B¹ (FIG. 3) whose shape and location are similar to those of space B. Spaces B and B¹ are closed with blank plugs 37 welded into the wall of the body 21. Spaces B and B¹ are interconnected by a channel 38 located in the valve body 21. The channel 38 with space B¹ serves as a branch of the channel for the delivery of compressed gas to the second actuating mechanism, i.e., to the piston 18 (FIG. 1) of the penumatic cylinder 16.

The valve body 21 accommodates pipe connections 39 and 40 arranged coaxially with each of the closing elements 25 (FIG. 3) and 26, respectively; each of these pipe connections is a continuation of the corresponding channel for the delivery of compressed gas to the actuating mechanism. Branching off from each of the pipe connections 39 and 40 is a channel 41 (FIG. 4) and 42, respectively, said channel being set perpendicularly to the axis of the pipe connection and intended for the delivery of compressed gas directly into the chamber of the corresponding pneumatic cylinder 16 and 17 (FIG. 1).

The upper end (in the drawing) of the pipe connection 39 (FIG. 3) serves as a seat for the closing element 25 while the lower end of the pipe connection 40, as a seat for the closing element 26. The inner cylindrical surface of each pipe connection 39 and 40 serves as a guide for the moving closing element 25 and 26, respectively.

Figure 4:
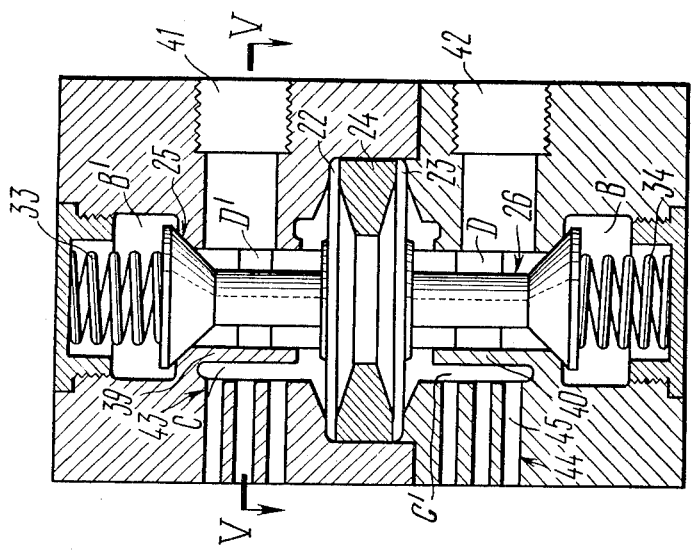
FIG. 4 is a section taken along line IV — IV in FIG. 2.

The outer side surface of the pipe connection 39 and 40, together with the surface of the space in the body 21 and the corresponding elastic diaphragm 22 and 23, forms a semicircular space C and C¹, respectively (FIG. 4).

Branching out from each space C and C¹ are channels 43 and 44, respectively, made in the valve body 21 and intended to discharge the used gases from the pneumatic cylinders 16 and 17 (FIG. 1) into the atmosphere. Each of the channels 43 (FIG. 4) and 44 is made in the form of a number of holes 45 (FIG. 5) flaring out in the direction of the outer surface of the body 21 to reduce the noise caused by the discharge of gases into the atmosphere.

The motion of the closing elements 25 (FIG. 3) and 26 is controlled by a servo-actuated valve 46 provided in the valve 20. The valve 20 comprises two servo-actuated valves 46 (FIG. 2), one of them serving as a stand-by mechanism should the other one fail for some reason. The servo-actuated valves 46 are located in the body 21 of the valve 20 parallel to each other. Each servo-actuated valve 46 is accommodated in the valve body in a stepped cylindrical hole 47 (FIG. 3) whose axis is parallel to the axis of the closing elements 25 and 26. This hole is provided with a pressed-in sleeve 48 with an axial through hole in which a prism 49 is loosely installed. Near the end of the sleeve 48, coaxially with its hole, there are cylindrical bores 50 and 51 accommodating balls 52 and 53, respectively. The lower end (in the drawing) of the sleeve 48 bears against the step in the cylindrical hole 47 of the body 21. Installed in the upper part (in the drawing) of the hole 47 is a plug 54. The same hole 47 accommodates a pushrod 55 with a spring 56 under the sleeve 48; one end of said spring 56 bears against the pushrod 55 while its other end bears against the face of the armature 57 of the electromagnet 58. The electromagnet 58 is secured outside, on the body, 21 of the valve 20.

The bore 50 in the sleeve 48 of each servo-actuated valve 46 is connected with space B¹ of the body 21 by channel 59 made in said body 21. Thus, each servo-actuated valve 46 is in constant communication with the channel for the delivery of compressed gas to the actuating mechanism. Space A between the diaphragms 22 and 23 is connected with the hole in the sleeve 48 by a channel 60 passing through the body 21 and the ring 24. The space between the lower (in the drawing) end of the sleeve 48 and the pushrod 55 communicates with the atmosphere through a channel 61 in the body 21.

The servo-actuated valves can be interlocked by a channel 62 (FIG. 2) in the body 21, arranged at approximately the same level as the channel 60.

In the initial position the cones 27 (FIG. 3) of the closing elements 25 and 26 are in contact with their respective seats, thus shutting off the channels 41 and 42 (FIG. 4) for the delivery of compressed gas to the cylinders 16 and 17 (FIG. 1).

The armature 57 (FIG. 3) of the electromagnet 58 is in the downmost position, therefore the ball 53 rests on the surface of the pushrod 55, thus leaving open the entrance into the hole of the sleeve 48 whereas the ball 52 is in the downmost position, shutting off the hole in the sleeve 48 and, consequently, separating space B¹ from space A.

Space A is open to the atmosphere through channel 60, through the clearance between the ball 52 and the entrance into the hole in the sleeve 48 and through the channel 61.

The electropneumatic valve functions as follows.

On energizing the electromagnet 58, its armature 57 goes up, moving pushrod 55 and overcoming the resistance of spring 56. The ball 53 also moves upward, closing the hole in the sleeve 48 and separating space A between the diaphragms 22 and 23 from the channel 61 and, as a consequence, from the atmosphere.

The prism 49 moving simultaneously with the ball 53, shifts the ball 52 upward. This opens the upper (in the drawing) entrance into the hole in the sleeve 48 so that compressed gas entering the body 21 through the hole 36 passes through the channel 38 into space B¹ and further, through the channel 59, through the clearance between the surfaces of the prism 49 and those of the hole in the sleeve 48 and through the channel 60 into space A between the diaphragms 22 and 23. The gradual rise of gas pressure in space A deflects first the diaphragm 22, moving the closing element 25 and overriding the spring 33 which is less stiff than the spring 34. This forms a gap between the cone 27 and its seat.

The deflection of the diaphragm 22 depends on the distance between said diaphragm and the end of the pipe connection 39. As soon as the diaphragm 22 closes the pipe connection 39, the gas starts flowing from space B¹ through the gap between the cone 27 and its seat, passes into the spaces between the ribs 29 of the closing element 25 and further flows through the ports 30 in the ribs 29 into the channel 41 (FIG. 4), then into the cylinder 17 (FIG. 1) controlling the brake 9 which is thus released.

At the moment when the diaphragm 22 (FIG. 4) closes the pipe connection 39, the diaphragm 23 starts deflecting; overcoming the resistance of the spring 34 it shifts the closing element 26.

As soon as the diaphragm 23 (FIG. 3) closes the pipe connection 40, the gas starts flowing from space B through the gap between the cone 27 of the closing element 26 and its seat, passes into the spaces between the ribs 29 and enters the channel 42 through the ports 30 and further into the cylinder 16 (FIG. 1) which controls the clutch 8.

The clutch 8 is engaged and the movement is transmitted from the shaft 2 via the pulley 3, belt drive 4 and flywheel 5 to the shaft 6 wherefrom it is conveyed by a pair of gears 10 and 11 to the crankshaft 12; then the connecting rod 14 transmits motion to the slide 15 which executes a working stroke and returns to the initial position after which it is necessary to release the clutch 8 and apply the brake 9 for braking the shaft 6.

For this purpose the electromagnet 57 is deenergized and its armature goes down to the initial position. The downward movement of the armature is followed by the pushrod 55 with the spring 56, the ball 53, prism 49 and ball 52 which closes the entrance into the hole of the sleeve 48. This opens space A to the atmosphere through the channel 60, through the gap between the ball 53 and the entrance into the hole of the sleeve 48 and further, through the channel 61. Pressure in space A drops slowly and the diaphragm 23 is returned by the stiffer spring 34 to the initial position, opening the pipe connection 40.

The closing element 26 comes down on its seat and the space of the cylinder 16 (FIG. 1) is put in communication through the channel 42 (FIG. 4) and space $C^1$ between the pipe connection 40 and the inner space of the body 21 with the channel 44 whose holes 45 discharge the used gas into the atmosphere.

As pressure is space A continues to drop, the diaphragm is returned to the initial position by the spring 33 and opens the pipe connection 39.

The closing element 25 comes down on its seat and the space of the cylinder 17 (FIG. 1) is put in communication through the channel 41 and the space between the pipe connection 39 (FIG. 4) and the inner surface of space C in the body 21 with the channel 43 whose holes 45 discharge the used gas into the atmosphere.

If it happens that after deenergizing of the electromagnets 58 of one of the servo-actuated valves 46 the armature 57 gets stuck, space A will be vented to the atmosphere through the channel 62 (FIG. 2) and through the serviceable servo-actuated valve 46. This will prevent the repeated engagement of the clutch 8 (FIG. 1) and the repeated stroke of the slide 15 thus promoting the safety of press operators.

We claim:

1. An electropneumatic valve for the control of motions of an actuating mechanism comprising: a body with channels for the delivery of compressed gas to an actuating mechanism and discharge of used gas into the atmosphere, and a space in its central part; two elastic diaphragms arranged parallel to each other in said body and forming a space between them; a spring-loaded closing element rigidly connected to one of said diaphragms and intended to shut off the channel for the delivery of compressed gas in said body; a servo-actuated valve intended to control said closing element; said servo-actuated valve with a space inside which is in constant communication with the channel in said body for the delivery of compressed gas and is periodically put in communication with the space between said diaphragms; channels for the delivery of compressed gas and a channel for the discharge of the used gas into the atmosphere, each of said channels provided with a branch for the delivery of compressed gas to, and its discharge from, another actuating mechanism; a second spring-loaded closing element installed in the branch of said channel for the delivery of compressed gas and rigidly connected with the other of said diaphragms; said spring-loaded closing elements with springs whose stiffness is different to ensure successive opening of said closing elements.

2. An electropneumatic valve according to claim 1 wherein the valve body accommodates a pipe connection arranged coaxially with each of said closing elements and serving as a continuation of the channel for the delivery of compressed gas to the actuating mechanism; in the closed position of the closing element said pipe connection communicates with the channel for the discharge of the used gas into the atmosphere whereas in the open position of the closing element said pipe connection is closed by the corresponding elastic diaphragm.

* * * * *